United States Patent [19]
Rault et al.

[11] Patent Number: 4,707,849
[45] Date of Patent: Nov. 17, 1987

[54] HIGH SPEED AUTOMATIC TEST APPARATUS ESPECIALLY FOR ELECTRONIC DIRECTORY TERMINALS

[76] Inventors: Michel Rault, rue de Hingard Brelevenez, 22300 Lannion; Claude Heno, 99, rue de Toul ar Lann, 22700 Perros-Guirec, both of France

[21] Appl. No.: 835,251

[22] Filed: Mar. 3, 1986

[30] Foreign Application Priority Data

Mar. 5, 1985 [FR] France .................... 85 03207

[51] Int. Cl.⁴ ............................................. H04M 1/24
[52] U.S. Cl. ........................................ 379/28; 379/96; 371/20; 364/580
[58] Field of Search .................. 379/27, 28, 93, 97, 379/98, 96; 375/10; 364/551, 578, 580; 371/20

[56] References Cited

U.S. PATENT DOCUMENTS

| | | | |
|---|---|---|---|
| 4,055,801 | 10/1977 | Pike et al. ........................ | 371/20 X |
| 4,168,527 | 9/1979 | Winkler ............................ | 364/580 |
| 4,455,653 | 6/1984 | Le Gors et al. .................. | 371/20 |
| 4,455,654 | 6/1984 | Bhaskar et al. .................. | 371/20 |
| 4,489,414 | 12/1984 | Titherley ......................... | 371/20 |
| 4,554,663 | 11/1985 | Pham van Cang ............... | 371/20 |
| 4,598,398 | 7/1986 | Doggett ........................... | 375/10 X |
| 4,602,534 | 7/1986 | Atkinson et al. ................. | 379/27 |
| 4,646,299 | 2/1987 | Schinabeck et al. .............. | 371/20 |
| 4,654,812 | 3/1987 | Yoshida ............................ | 364/578 |
| 4,656,632 | 4/1987 | Jackson ........................... | 364/580 X |
| 4,658,400 | 4/1987 | Brown et al. .................... | 371/20 X |

FOREIGN PATENT DOCUMENTS

| | | | |
|---|---|---|---|
| 0172640 | 2/1986 | European Pat. Off. .......... | 371/20 |
| 0144911 | 8/1983 | Japan ............................... | 364/578 |
| 0211341 | 11/1984 | Japan ............................... | 364/578 |
| 0029822 | 2/1985 | Japan ............................... | 364/578 |
| 0118959 | 6/1985 | Japan ............................... | 371/20 |

Primary Examiner—Gene Z. Rubinson
Assistant Examiner—Matthew E. Connors
Attorney, Agent, or Firm—Laubscher & Laubscher

[57] ABSTRACT

A test apparatus for testing the operation of data transmission terminals such as videotex or directory terminals. The test apparatus comprises two adaptation plugs to be plugged respectively into a telephone plug and a terminals and peripherals adaptor of a terminal to be tested, a data processing unit, a modem, and means for delivering test instruction sequences to the processing unit to test terminal operation. The delivering means has a read-only memory incorporated in the processing unit of the apparatus, so that the apparatus can be used without having to connect it to a remote server through the telephone network.

3 Claims, 4 Drawing Figures

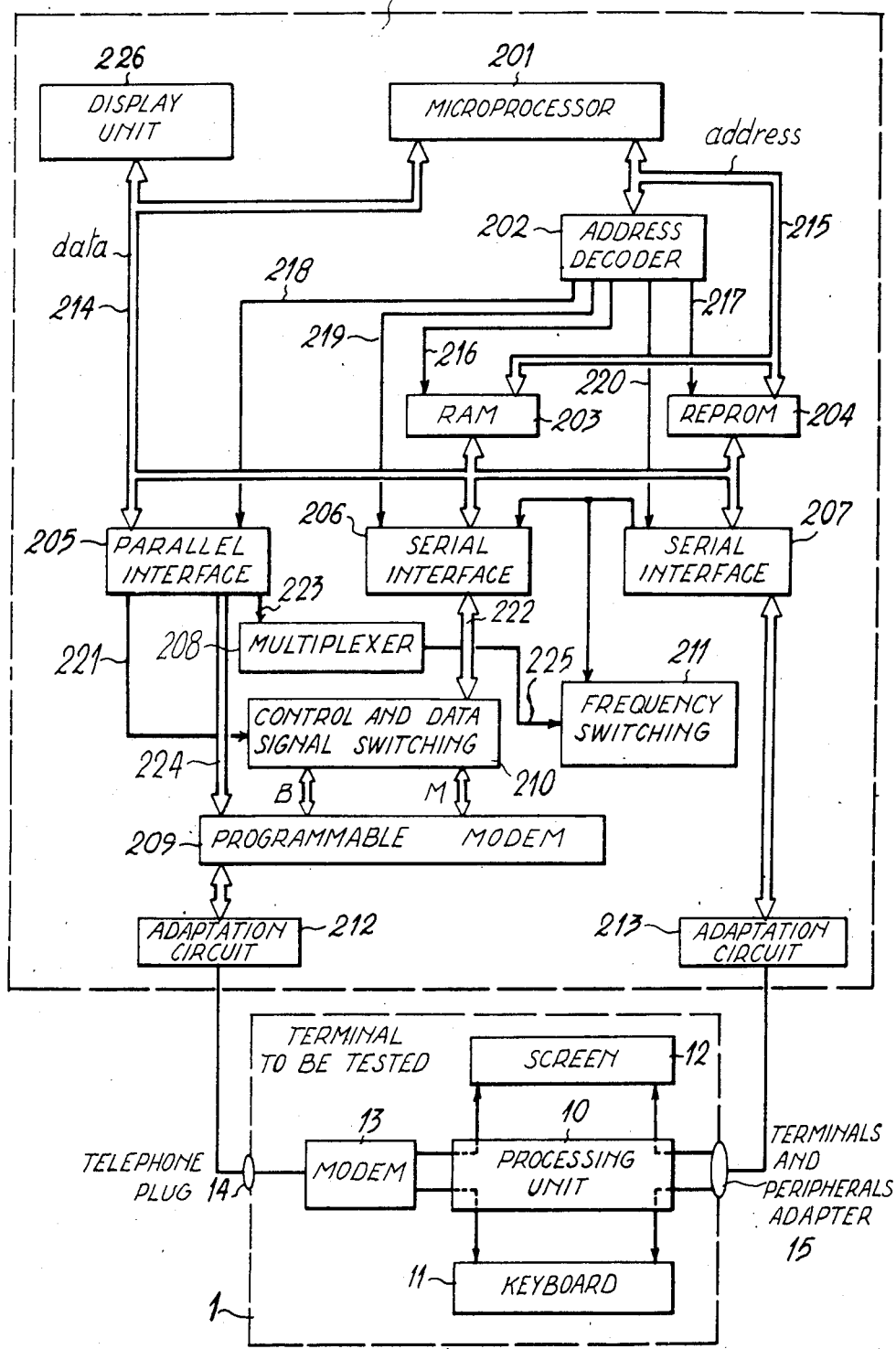

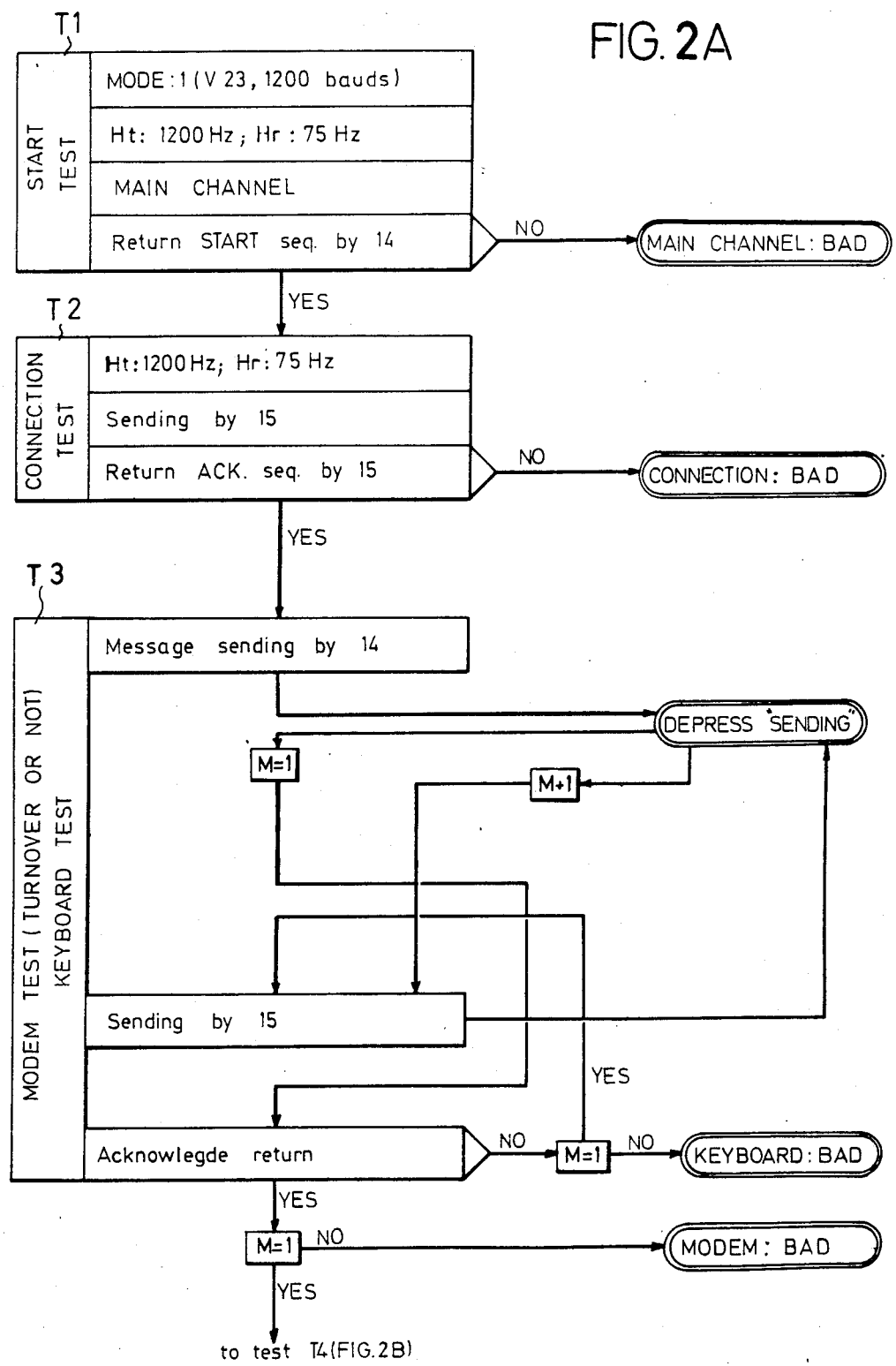

HIGH SPEED AUTOMATIC TEST APPARATUS ESPECIALLY FOR ELECTRONIC DIRECTORY TERMINALS

BACKGROUND OF THE INVENTION

1. Field of the Invention

The present invention relates to a portable high speed automatic autonomous test apparatus for data transmission terminals and more particularly, for videotex terminals such as "MINITEL" type French directory terminals.

A directory terminal comprises a modem connectable to the telephone network via a telephone plug, a processing unit connected to the modem, a display screen connected to the processing unit and a control keyboard connected to the processing unit. The terminal moreover contains a so-called "peripherals and terminals" adapter providing for connections to the various peripherals.

2. Description of the Prior Art

Numerous directory terminals are already installed for subscribers to the telephone network and their number is going to increase in considerable proportions. It is therefore becoming necessary to equip maintenance services with high speed trouble-shooting means enabling the technicians to instantly check the operation of a terminal.

Maintenance and repair equipment for data terminals is already known which is portable and housed in an "attache-case". This equipment connects with the telephone plug of the subscriber's telephone installation, to the telephone plug of the directory terminal and to the peripherals and terminals adapter of this same terminal. The equipment contains a modem, a data processing unit, a keyboard and a display screen and is connected, via the telephone line, to a remote server or data system which enables interconnection with assistance software. This equipment forms an electronic repair unit enabling a technician to have permanent and interactive assistance available for troubleshooting and for terminal testing and setting procedures.

OBJECT OF THE INVENTION

The main object of this invention is to provide a test apparatus enabling an operator responsible for maintenance to do without the assistance of a telephone network server. The apparatus contains its own software providing an automatic and interactive test of a data transmission terminal.

SUMMARY OF THE INVENTION

More particularly the test apparatus embodying the invention delivers sequences of operating test instructions to the terminal to be tested. If the terminal is in correct working order, it should reply to each sequence of instructions by an acknowledge signal. If the test apparatus does not receive the acknowledge signal, it issues a warning signal or a message corresponding with the sequence of instructions, this message being displayed on the terminal screen or on a screen incorporated into the test apparatus.

The advantages that the invention confers are:

simplicity of use: the operator's task consists basically in connecting the test apparatus to the terminal and switching them on;

automation: the test starts and is performed on its own and a faulty subassembly in the terminal is indicated;

autonomy: there is no connecting or calling on the telephone network;

flexibility of use: adaptation to various types of terminals can be obtained by exchanging a plug-in module which constitutes a read-only memory in the apparatus containing the sequences of instructions, or still again by simply switching from one ROM area to another.

In accordance with the invention, there is provided a test apparatus for a data transmission terminal. The terminal to be tested comprises a telephone plug, a modem connectable to the telephone network via the plug, a data processing unit connected to the modem, a keyboard and a display screen connected to the processing unit, and a ternimals and peripherals adapter. The test apparatus comprises an adaptation plug to be plugged into the telephone plug of the terminal to be tested, a modem, a data processing unit, an adaptation plug to be plugged into the terminals and peripherals adapter of the terminal, and means for delivering test instruction sequences to the processing unit of the apparatus to test terminal operation. The test instruction sequence delivering means has a read-only memory incorporated in the processing unit of the apparatus, so that the apparatus can be used without having to connect it to a server through the telephone network.

Advantageous embodiments:

the read-only memory is a program memory of a microcomputer which automatically delivers the sequences of instructions in a predetermined order, the processing unit of the test apparatus comprises means for detecting each of the acknowledge sequences returned from the terminal in response to each of the instruction sequences respectively, and means for stopping the instruction sequences if there is no response;

the apparatus moreover comprises means for transmitting a warning signal when one of the instruction sequences is stopped;

the warning signal transmitting means includes means for displaying on a screen incorporated into the apparatus or on the terminal screen a message corresponding to one of the instruction sequences which has not entailed in the transmitting of the acknowledge from the tested terminal.

BRIEF DESCRIPTION OF THE DRAWING

Other features and objects of this invention will be more clearly apparent from the following description of the preferred embodiments of the invention as illustrated in the accompanying corresponding drawings in which:

FIG. 1 shows functional block diagrams of a test apparatus embodying the invention, and of a terminal being tested;

FIGS. 2A and 2B are condensed algorithms illustrating the performance of different terminal test phases by the test apparatus in FIG. 1; and FIG. 3 is a table relating to the mode, clock and channel selection signals which are derived in circuits of the apparatus.

DESCRIPTION OF THE PREFERRED EMBODIMENTS

Figures 2B, 3:
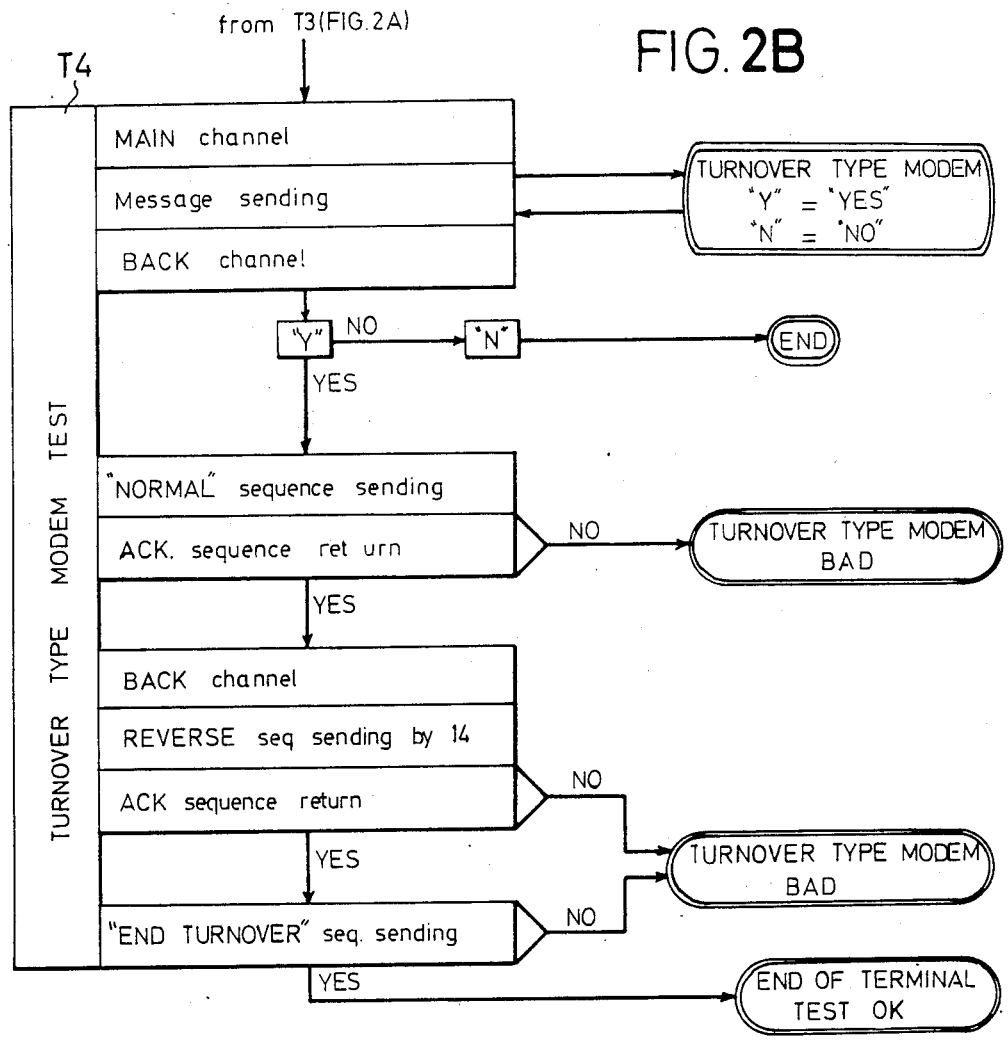

Referring to FIG. 1, a MINITEL type videotex terminal 1 to be tested basically comprises a processing unit 10, a keyboard 11, a screen 12, a modem 13, whether of the turnover type or not, and two connection plugs, i.e., a telephone plug 14 and a terminals and peripherals adapter 15.

It is recalled that, in its present day version, the MINITEL terminal communicates with servers or data systems to which it is connected through the telephone network, according to an asymmetric transmission mode. The terminal recieves data at a rate of 1,200 bauds and transmits data at a rate of 75 bauds. Nevertheless these rates can be switched round if the modem 13 is a turnover type. As to the rate of data exchange between the terminal and peripheral which are connected through the terminals and peripherals adapter 15, this is in principle 1,200 bauds on switching on, but can be easily modified, either through keyboard 11, or through a peripheral. Finally the modulation respects the CCITT (International Telegraphic and Telephone Consultative Committee) Recommendation V23, although it is also possible to apply the views in CCITT Recommendation V21.

These reminders explain that a test apparatus 2 operates two channels, i.e., a MAIN channel, that can be used at 300, 600 and 1,200 bauds, and a BACK channel that can be used at 75 bauds. The modulation employed is V23 type because the V21 type modulation does not provide for the use of the BACK channel.

To simplify this specification, terminal 1 to be tested is now simply referred to as "terminal", and the test apparatus 2 according to the invention is referred to as "tester".

Still referring to FIG. 1, the tester 2 contains a processing unit such as microprocessor 201, an address decoder 202, a random access memory (RAM) 203, and an instructions read-only memory preferably of reprogrammable type (REPROM) 204, a parallel interface 205, two serial interfaces 206 and 207, a multiplexer 208, and a programmable modem 209. Items 201 to 209 comprise normal commercial integrated circuits. Tester 2 also contains a control and data signal switching control circuit 210, a frequency switching control circuit 211 and two adaptation circuits 212 and 213.

A data bus 214 routes data words between microprocessor 201, memories 203 and 204 and interfaces 205, 206 and 207. An address bus 215 routes address words between microprocessor 201, decoder 202 and memories 203 and 204. The address decoder 202 delivers addressing control signals to addressing inputs of memories 203 and 204 and interfaces 205, 206, and 207 via links 216, 217, 218, 219, and 220 respectively.

The switching control circuits 210 and 211 are logical gate circuits. Circuit 210 is controlled by parallel interface 205 via a link 221 and delivers control and data signals to the serial interface 206 through links 222, B and M. Interface 205 also delivers switching control signals to multiplexer 208 and mode selection signals to modem 209 respectively through links 223 and 224. As for the frequency switching control circuit 211, it receives from an output 225 from mulitplexer 208 signals enabling circuit 207 to control a clock frequency selection.

FIG. 1 also shows a display unit 226 connected to data bus 214. Unit 226 is intended for displaying messages which are invitations to depress certain keys, or test results. Unit 226 may not be necessary insofar as these messages can be sent via plug 14 and adapter 15 of terminal 1 to be displayed on terminal screen 12.

Refer next to the table in FIG. 3. The left hand part is devoted to the mode selection words delivered by the parallel interface 205 (FIG. 1) to the corresponding control inputs of programmable modem 209 via link 224. It can be seen that five bits are sufficient to determine the transmit and receive operations respectively in modes V21 and V23. The right hand part of the table in FIG. 3 indicates the values of the bits delivered by multiplexer 208 to frequency switching control circuit 211 and by the latter to modem 209 in order to define the transmit and receive clock frequencies and also the channel employed, i.e., either the MAIN channel transmitted by telephone plug 14 and adaptation circuit 212, or the BACK channel transmitted by the terminals and peripherals adapter 15 and adaptation circuit 213.

The itemization at the head of the columns of the table in FIG. 3 are provided simply as examples and refer to the inputs of the employed programmable modem 209 which is an "Advanced Micro. Devices" AM7910 type commercial integrated circuit.

A test algorithm commences in FIG. 2A and ends in FIG. 2B. The algorithm contains four tests T1 to T4. Test T1 (see the left hand sections) checks the performance of a start sequence corresponding to the switching on of terminal 1. Test T2 checks the performance of a connection sequence corresponding to the connecting of terminal 1 to the network. Test T3 checks the operating of modem 13 with "normal" transmission and the operating of keyboard 11, in the different modes employed. Finally test T4 more especially concerns the case in which modem 13 is of the turnover type, the check being then made with both "normal" and "reverse" transmission.

It is recalled that the various parameters such as mode, clock frequency and choice of channel, are controlled by the value of the bits delivered to the control inputs of modem 209 (see table in FIG. 3).

Finally it is assumed that tester 2 is not provided with a displya unit 226 and that the messages are displayed on screen 12 of terminal 1.

In order to begin the series of tests, an operator commences by making sure that when switching on terminal 1 this lights up the terminal screen 12. If this is the case, the operator makes the necessary connections between the terminal and the tester to connect plug 14 and adapter 15 of the terminal to adaptation circuits 212 and 213 of the tester respectively, and switches on the tester 2.

The start test T2 then immediately commences. Tester 2 delivers to terminal 1, via telephone plug 14, signals determining mode 1 operation: channel V23, transmission rate 1,200 bauds, transmission clock frequency Ht=1,200 Hz, receive clock frequency Hr=75 Hz, and use of the MAIN channel. If the terminal is initialized correctly, the terminal should return to the tester a digital sequence announcing the correct performance of the operation.

It is recalled that the acknowledge sequences, release sequences, ets., delivered by the terminal are normally designed for the network. In the case of the MINITEL terminal, these sequences consist of a series of two numbers, for example in hexadecimal code, 13.53 or 13.41, etc. It is specified that in the algorithm described here, the term "sending" defines a transmission in the tester to terminal direction and the term "return" a transmission in the terminal to tester direction.

If the terminals and peripherals adapter 14 does not return the correct performance signal to tester 2, the tester delivers to the terminal a message such as "MAIN CHANNEL: BAD" which is displayed on screen 12 and the test is halted. In the opposite case the test continues with the connection test T2.

The connection test T2 comprises checking the correst execution of the connection sequence, and includes the following phases:

sending of the connection order by tester 2 via the terminals and peripherals adapter 15 and return of the acknowledge sequence by the terminal via the same adapter 15 to interface 207.

If the acknowledge sequence is not returned, screen 12 displays "CONNECTION: BAD" and the test is ended.

In the opposite case, test T3 commences by sending, via telephone plug 14, a message "DEPRESS SENDING KEY". This message is displayed on screen 12. The operator should then depress a "SENDING" key on keyboard 11 of the terminal. It is recalled that mode 1 (V23, 1,200 bauds) has been selected when starting test T1. The acknowledge sequence is returned via the terminals and peripherals adapter 15.

If the acknowledge sequence is effectively returned and if modem 13 operates on mode 1, which is effectively the case in the phase considered here, the test is then said to be satisfactory and test T4 is commenced. If the acknowledge sequence is not returned, tester 2 checks that mode 1 is being duly employed, then again displays on screen 12 the invitation to depress the key "Sending by 15", controls switching to the next mode (M+1), then again waits for the return of the acknowledge sequence. If this does not occur, screen 12 displays "KEYBOARD: BAD". If per contra the acknowledge sequence is returned, screen 12 displays "MODEM: BAD".

Test T4 (FIG. 2B) concerns additional testing operations required if modem 13 is of the turnover type, which is only performed if the previous tests T1 to T3 are satisfactory.

Tester 2 sends to terminal 1 via the MAIN channel a following message to be displayed on screen:

"TURNOVER TYPE MODEM ? (KEY Y FOR YES, N FOR NO)",

If the operator has depressed a "N" key, the tester delivers to the terminal the end-of-test message which is displayed on the screen.

If the operator has depressed a "Y" key, tester 2 transmits the so-called "normal" turnover sequence. Failure to receive the acknowledge sequence produces a display, on screen 12 of the terminal, of a message "TURNOVER TYPE MODEM: BAD" and the test is halted. If the acknowledge sequence is received, the tester selects the BACK channel and delivers the "reverse" turnover sequence via the terminals and peripherals adapter 15. Receiving of the acknowledge sequence produces display of an "END OF TERMINAL TEST: OK" message and failure to receive it produces display of a "TURNOVER TYPE MODEM: BAD" message. In any event the test is over.

What we claim is:

1. Apparatus for testing a videotex terminal adapted for connection with a telephone subscriber line and a digital peripheral device,
    (a) said terminal comprising
        (1) a telephone plug (14) adapted for connection with the telephone line;
        (2) a peripheral plug (15) adapted for connection with the digital peripheral device;
        (3) a first modem (13) connected between said telephone and peripheral plugs for transmitting and receiving two-frequency modulated signals; and
        (4) a data processing unit (10) having a display screen (12) and a keyboard (11) connected therewith, said data processing unit being connedted between said first modem and said peripheral plug for processing and switching digital signals between said first modem and said peripheral plug, and between said display screen and said keyboard; and
    (b) said testing apparatus comprising
        (1) mans including a second modem (209) connected with said terminal telephone plug for converting first digital test signals into first two-frequency modulated signals for transmission to said terminal modem and for converting second two-frequency modulated signals that are transmitted by said terminal modem in response to predetermined digital signals received and processed in said terminal data processing unit into first digital response signals;
        (2) digital means connected with said terminal peripheral plug for transmitting second digital test signals to said terminal data processing unit and for receiving second digital response signals in response to predetermined digital signals received and processed in said terminal data processing unit; and
        (3) data processing means including a test instruction read only memory for deriving said first and second digital test signals and for checking said first and second digital response signals, said digital test signals being derived in accordance with test instructions and a response signal check.

2. Apparatus as defined in claim 1, wherein said testing apparatus data processing means derives a particular digital message and terminates the test instructions when one of said first and second response signals is erroneous, and further wherein said particular digital message is transmitted through said second modem and said terminal first modem and displayed on said terminal display screen.

3. Apparatus for testing a videotex terminal connecting a telephone subscriber line via a telephone plug with a peripheral device via a peripheral plug and including a first modem for transmitting and receiving two-frequency modulated signals and a data processing unit connected between the modem and the peripheral device for processing and switching digital signals therebetween, comprising
    (a) means including a second modem connected with said terminal telephone plug for converting first digital test signals into first two-frequency modulated signals for transmission to said terminal modem and for converting second two-frequency modulated signals that are transmitted by said terminal modem in response to predetermined digital signals received and processed in said terminal data processing unit into first digital response signals;
    (b) digital means connectd with said terminal peripheral plug for transmitting second digital test signals to said terminal data processing unit and for receiving second digital response signals in response to predetermined digital signals received and processed in said terminal data processing unit; and
    (c) data processing means including a test instruction read only memory for deriving said first and second digital test signals and for checking said first and second digital response signals, said digital test signals being derived in accordance with test instructions and a response signal check.

* * * * *